United States Patent [19]

Bindler et al.

[11] Patent Number: 4,822,268
[45] Date of Patent: Apr. 18, 1989

[54] CONVEYING AND TREATMENT APPARATUS FOR MOULDS FILLABLE WITH A CASTABLE, SOLIDIFYING BODY, SUCH AS CHOCOLATE MASS

[75] Inventors: Uwe Bindler, Bergneustadt; Theo Schürholz, Reichshof-Eckenhagen, both of Fed. Rep. of Germany

[73] Assignee: Gebr. Bindler GmbH & Co, KG, Bergneustadt, Fed. Rep. of Germany

[21] Appl. No.: 155,190

[22] Filed: Feb. 12, 1988

[30] Foreign Application Priority Data

Feb. 16, 1987 [DE] Fed. Rep. of Germany ....... 3704761

[51] Int. Cl.[4] .......................... B29C 32/36; B29C 39/04
[52] U.S. Cl. ..................................... 425/454; 198/457; 198/604; 198/607; 425/256
[58] Field of Search ....................... 198/457, 604, 607; 425/256, 259, 261, 404, 453, 454; 426/514, 515

[56] References Cited

U.S. PATENT DOCUMENTS

| | | | |
|---|---|---|---|
| 880,300 | 2/1908 | Hain | 425/404 |
| 1,118,619 | 11/1914 | Baker | 425/404 |
| 1,169,602 | 1/1916 | Bausman | 425/453 |
| 1,475,579 | 11/1923 | Harlan | 425/453 |
| 3,318,263 | 5/1967 | Jeffrey | 425/261 |
| 3,798,337 | 3/1974 | Abalo | 426/515 |
| 3,801,255 | 4/1974 | Meyer | 425/453 |

FOREIGN PATENT DOCUMENTS

2022602 11/1970 Fed. Rep. of Germany .
7136858 12/1971 Fed. Rep. of Germany .
2855982 7/1980 Fed. Rep. of Germany .

Primary Examiner—Willard Hoag
Attorney, Agent, or Firm—Sprung Horn Kramer & Woods

[57] ABSTRACT

The invention relates of a conveying and treatment apparatus for double moulds for making hollow bodies of a castable, solidifying substance, such as chocolate mass. The double moulds consist of two plate-shaped mould halves which have corresponding mould cavities and are laid one above the other to close the cavities. The apparatus comprises a conveying path via which the double moulds filled with the mass can be fed to a transfer device which takes over the double moulds after the fashion of continuous lift and supplies the moulds to an endless conveyor. During conveying in the transfer device (7), the double moulds are conveyed in parallel and synchronously with supporting and retaining elements of the endless conveyor, being transferred in synchronism by means of a pushing device from the transfer device to the chain conveyor. During conveying in the endless conveyor the double moulds are held together and at the same time rotated around their own axes, more particularly around two axes, so that the castable body gradually solidifies by cooling on the walls of the mould cavities.

9 Claims, 2 Drawing Sheets

CONVEYING AND TREATMENT APPARATUS FOR MOULDS FILLABLE WITH A CASTABLE, SOLIDIFYING BODY, SUCH AS CHOCOLATE MASS

BACKGROUND OF THE INVENTION

1. Field of the Invention

The invention relates to a conveying and treatment apparatus for moulds consisting of one or two superimposed plates having mould cavities for a castable, solidifying body, such as chocolate mass, the apparatus having a circulating endless conveyor, more particularly constructed in the form of a chain conveyor, which has supporting and retaining elements for receiving and turning the moulds.

2. Discussion of Prior Art

For the production of cavities of a castable, solidifying body, for example, chocolate mass, it is common practice to use double moulds having mould cavities whose top and bottom plates are each constructed with mould cavities corresponding to one another. After the castable body has been introduced into the mould cavities in the bottom plate, the cavities are closed by the application of the top plate.

Various apparatuses exist for producing the hollow bodies in this way.

In a known apparatus of the kind specified the bottom moulds are so attached to the supporting and retaining elements of the endless conveyor that they can be filled in this condition. The top mould is closed by an operator, who lays the top mould on the bottom mould and attaches it with clamps.

In another apparatus the bottom moulds filled with the castable body are conveyed over a horizontally extending conveying path to a turning cylinder. As operator closes the moulds by laying on the top mould and pushes the double moulds into matching drawers in the turning cylinder.

Both these apparatuses require an operative who completes the double moulds before they are turned, in the chain conveyor-or in the turning drum.

SUMMARY OF THE INVENTION

It is an object of the invention to provide a conveying and treatment apparatus of the kind specified wherein the completed double moulds are automatically fed to the supporting and retaining elements of the endless conveyor without the endless conveyor needing to be stopped for such transfer.

To this end according to the invention a horizontally extending conveying path for the moulds is disposed in front of a vertically extending portion of the endless conveyor, and disposed between the vertically ascending portion of the endless conveyor and the conveying path is a transfer device, from which the moulds taken over from the conveying path can be transferred in synchronism by means of a pushing device to the supporting and retaining elements of the endless conveyor.

Further features of the invention are characterized in the subclaims. For example, in a first embodiment the transfer device has bearing rails which are driven in the vertically extending portion of the endless conveyor in parallel and synchronously with the supporting and retaining elements of the endless conveyor. The supporting and retaining elements, which are mounted rotatably and/or pivotably on the endless conveyor with a view to the distribution of the castable body to the mould cavities, more particularly during conveying, are retained centred by guide rails provided in the vertical portion of the endless conveyor. Preferably the pushing device comprises a pusher which can be moved in the conveying direction of the conveying path and extends over the vertical conveying height of the moulds in the transfer device. Conveniently, the transfer device is constructed after the fashion of a continuous lift.

Due to the transfer device, more particularly constructed on the principle of a continuous lift, no difficulties arise either when the moulds are taken over from the conveying path by bearing rails of the transfer device, or when the moulds are transferred from the bearing rails to the supporting and retaining element of the endless conveyor. The change in the direction of conveying of the moulds during transition from the conveying path to the transfer device is therefore problem-free, since the distance of the bearing rails and therefore the time during which there are no bearing rails in the plane of the conveying path is large enough to transfer the double mould into the position in which it can be taken over by the bearing rails of the transfer device. Neither is any hindrance caused by the pusher, extending over the vertical conveying height of the double moulds in the transfer device, as a result of the large distance of the successive bearing rails. The whole time during which the supporting and retaining elements run in parallel and synchronously with the bearing rails of the transfer device is available for the transfer from the bearing rails of the transfer device to the supporting and retaining elements of the endless conveyor.

DESCRIPTION OF AN EMBODIMENT OF THE INVENTION

The description will now be described in greater detail with reference to an embodiment thereof diagrammatically illustrated in the drawings.

DETAILED DESCRIPTION OF THE EMBODIMENT OF THE INVENTION

Figure 1:
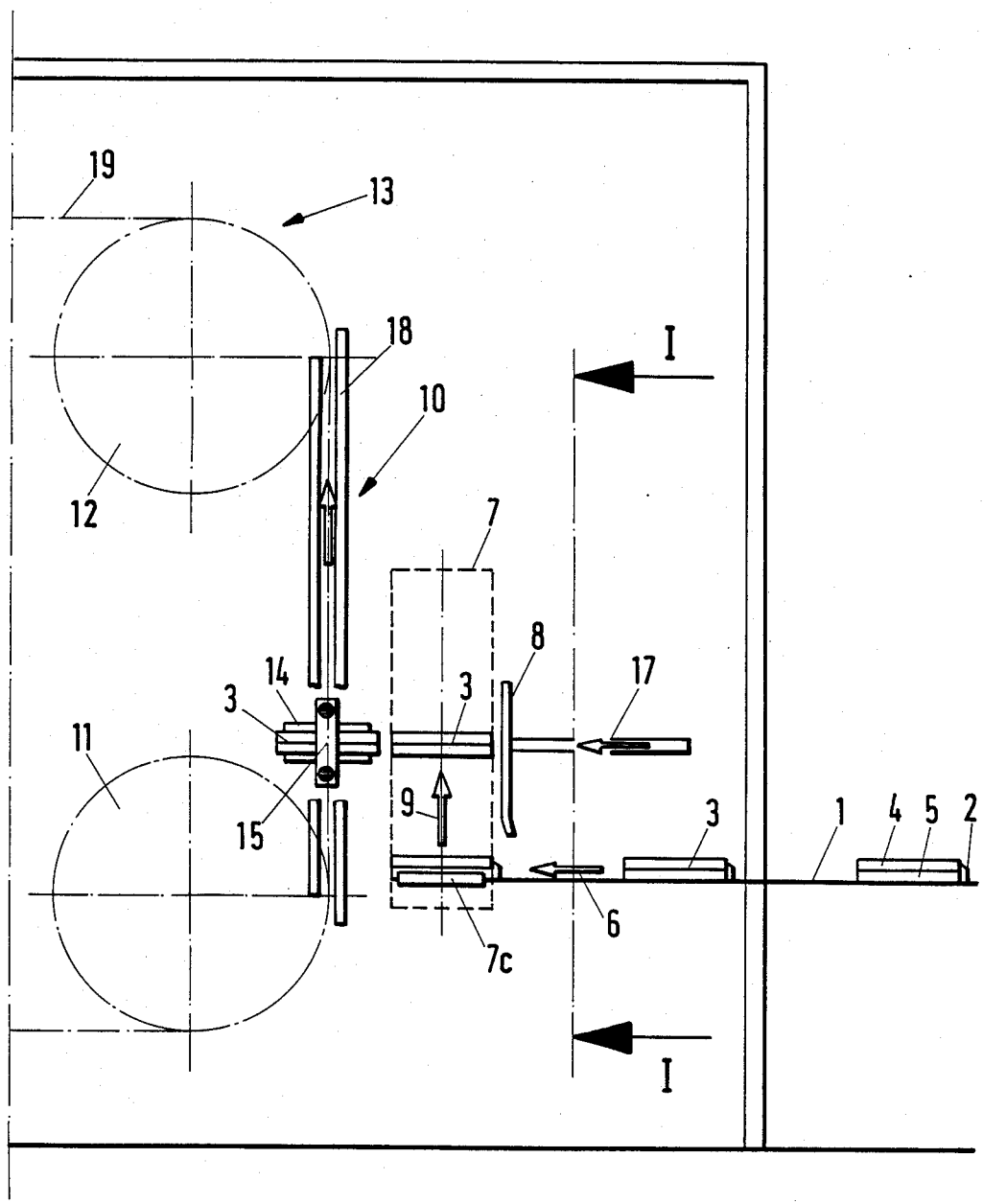
FIG. 1 shows a side elevation of the conveying and treatment apparatus in the zone of the transfer device, showing a portion of the horizontal conveying path and a portion of the endless conveyor.
Figure 2:
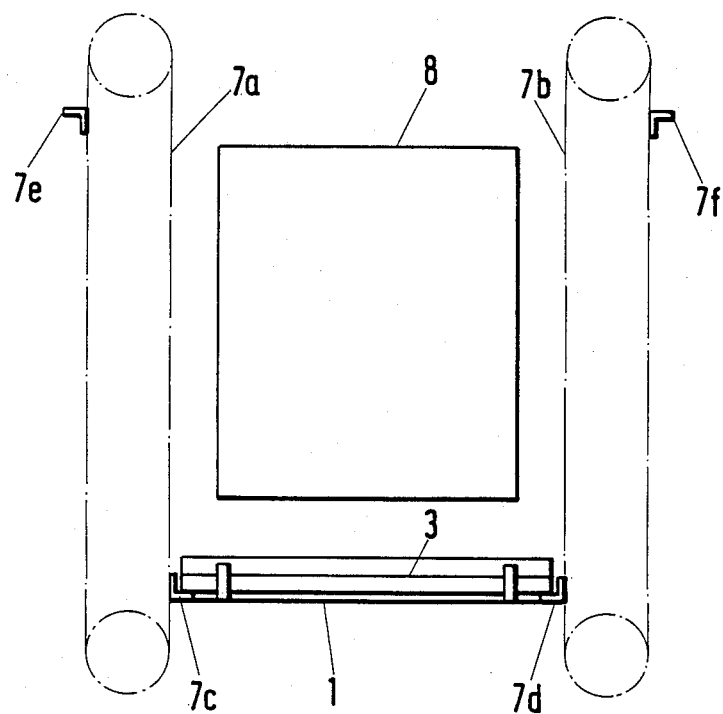
FIG. 2 shows a section, taken along the line I—I, of the conveying and treatment apparatus shown in FIG. 1.

Double moulds 3 lying flat at a mutual distance are conveyed by means of entraining members 2 over a conveying path 1. The double moulds 3 consist of two plate-shaped superimposed mould halves 4,5 in which corresponding closed mould cavities are provided. During conveying the lower mould halves 5 are already filled with a castable substance. The double moulds 3 are conveyed in the direction indicated by an arrow 6 to a transfer device 7 which is constructed after the fashion of a continuous lift. As shown in FIG. 2, the transfer device 7 has on both sides of the conveying path vertically extending endless chains 7a, 7b which bear bearing rails 7c–7f for the double moulds 3. The transfer device has a pusher plate 8 which extends substantially over the whole height of the vertical conveying of the double moulds 3 and can move in the direction shown by arrow 17 to push the double moulds from the bearing rails 7.

An endless conveyor 13 constructed as a chain conveyor has a pair of strands 19 which are guided via pairs of deflecting wheels 11,12 to which supporting and retaining elements 14 for the double moulds 3 are pivotably articulated. The supporting and retaining elements 14 enable the double mould not only to pivot around the axis 15, but also around an axis transverse thereto (not shown). The supporting and retaining elements 14 and therefore the double plates rotate around the two aforementioned axes by means of strands (chains) (not shown) extending parallel with the strands 19 and driving wheels (not shown) provided on the supporting and retaining elements 14 and coupled thereto, so that the double moulds perform a swashing movement during conveying.

Provided in the zone of the vertically extending portion 10 of the endless conveyor are guide rails 18 which retain non-rotatably the supporting and returning elements 14 otherwise freely rotatable, for the double moulds 3. To make this possible, a sliding clutch is provided between the supporting and retaining elements 14 for each of the two rotary movements.

The distance of the double moulds 3 on the conveying path 1 and the conveying speed on the conveying path 1 on the one hand, and the conveying of the double moulds 3 by the bearing rails 7c–7f in the transfer device 7 on the other hand, and also the conveying of the double moulds 3 in the supporting and retaining elements 14 in the vertical portion 10 of the endless conveyor 13 are so adjusted to one another that the individual transfers can take place without impedance and in synchronism. This means that there are no bearing rails 7c–7f in the conveying path during the time when a double mould 3 is conveyed from the conveying path 1 into the zone of the transfer device 7. The bearing rails 7c–7d run synchronously and in parallel with the supporting and retaining elements 14, so that the individual double moulds can be inserted into the supporting and retaining elements 14 running alongside in synchronism by anticipatorily moving the pusher plate 8 in the direction indicated by arrow 17. The distance to the next double mould 3 in the zone of the transfer device 7 is great enough to allow the anticipatory control and return movement of the pusher plate 8.

What is claimed is:

1. In a conveying apparatus having moulds comprising one or two superimposed plates defining mould cavities for a castable, solidifying material, the apparatus having a circulating endless conveyor which has supporting and retaining elements for receiving and turning the moulds, that improvement wherein a horizontally extending conveying means for the moulds is disposed in front of a vertically ascending portion of said endless conveyor, and disposed between the vertically ascending portion of said endless conveyor and the conveying means is a transfer device from which the moulds taken over from the conveying means are transferable in synchronism by means of pushing device to the supporting and retaining elements of said endless conveyor.

2. A conveying apparatus according to claim 1, wherein the transfer device has bearing rails which are driven in the vertically extending portion of the endless conveyor in parallel and synchronously with the supporting and retaining elements of the endless conveyor.

3. A conveying apparatus according to claim 1, wherein the pushing device comprises a pusher which is capable of being moved in the conveying direction of the conveying means and extends over the vertical conveying height of the moulds in the transfer device.

4. A conveying apparatus according to claim 1, wherein the transfer device is a continuous elevator.

5. A conveying apparatus according to claim 1, wherein the conveyor is a chain conveyor.

6. A conveying apparatus according to claim 1, wherein the supporting and retaining elements which are mounted on the endless conveyor are retained secure against rotation and pivoting by guide rails provided in the vertical portion of the endless conveyor.

7. A conveying apparatus according to claim 6, wherein the supporting and retaining elements are rotatably mounted on the endless conveyor.

8. A conveying apparatus according to claim 6, wherein the supporting and retaining elements are pivotably mounted on the endless conveyor.

9. A conveying apparatus according to claim 6, wherein the supporting and retaining elements are rotatably and pivotably mounted on the endless conveyor.

* * * * *